US012752359B1

(12) United States Patent
Araujo et al.

(10) Patent No.: US 12,752,359 B1
(45) Date of Patent: Oct. 6, 2026

(54) PIN BRAZED MOUNTING ARRANGEMENT

(71) Applicant: Tractian Technologies Inc, Atlanta, GA (US)

(72) Inventors: Marlon Douglas do Nascimento Araujo, São Paulo (BR); Vinicius Martim, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/568,688

(22) Filed: Mar. 16, 2026

(51) Int. Cl.

| | |
|---|---|
| ***B23K 1/00*** | (2006.01) |
| ***B23K 3/00*** | (2006.01) |
| ***B23K 3/08*** | (2006.01) |
| ***F16B 29/00*** | (2006.01) |
| *B23K 101/36* | (2006.01) |

(52) U.S. Cl.
CPC .............. *B23K 3/08* (2013.01); *B23K 1/0008* (2013.01); *F16B 29/00* (2013.01); *B23K 2101/36* (2018.08)

(58) Field of Classification Search
CPC .................... B23K 3/08; B23K 1/0008; B23K 2101/36–42; B23K 1/00–206; B23K 3/00–087; F16B 29/00
USPC ................ 228/135–140, 155–163, 245–255, 228/262.2–262.9
See application file for complete search history.

(56) References Cited

U.S. PATENT DOCUMENTS

| | | | | |
|---|---|---|---|---|
| 2,426,653 A * | 9/1947 | Whelan | ................. | F16B 37/048 228/56.3 |
| 3,610,663 A * | 10/1971 | Lago | ........................ | B23K 1/18 228/56.3 |
| 2011/0121054 A1* | 5/2011 | Chiu | ........................ | B23K 1/18 228/44.3 |
| 2018/0109008 A1* | 4/2018 | Brenninger | ............ | H01R 4/625 |
| 2020/0269337 A1* | 8/2020 | Hiyama | ................... | B23K 3/08 |
| 2023/0173600 A1* | 6/2023 | Wang | ........................ | B23K 1/20 |

FOREIGN PATENT DOCUMENTS

| | | | | |
|---|---|---|---|---|
| CN | 110060943 A * | 7/2019 | ............. | C23C 14/00 |
| CN | 115488461 A * | 12/2022 | ........... | B23K 1/0008 |
| CN | 120572082 A * | 9/2025 | ........... | B23K 3/0475 |
| CN | 120940768 A * | 11/2025 | ............. | B23K 1/206 |
| CN | 121889637 A * | 4/2026 | .............. | F28F 21/08 |

(Continued)

*Primary Examiner* — Kiley S Stoner
(74) *Attorney, Agent, or Firm* — Cognition IP, P.C.; Edward Steakley; Justin White

(57) ABSTRACT

A pin brazed mounting arrangement couples a mechanical component to a mechanical asset using a brazing pin and mounting adapter. The brazing pin has a neck, lower portion with a brazing capsule located below the neck, and upper portion located above the neck. The neck facilitates removal of the upper portion after actuating the brazing capsule to braze the brazing pin to an outer surface of the mechanical asset to leave behind a brazed stud having a threaded region. The mounting adapter has a top surface, bottom surface, plurality of side surfaces, first internally threaded region proximate its bottom surface configured to engage rotationally with the threaded region of the brazed stud to couple the mounting adapter to the brazed stud, and second internally threaded region proximate its top surface configured to accept a rotational insertion therein of a threaded portion of the separate mechanical component.

20 Claims, 12 Drawing Sheets

(56) References Cited

FOREIGN PATENT DOCUMENTS

| | | | | | |
|---|---|---|---|---|---|
| DE | 202016101425 | U1 | * | 5/2016 | ............... B23K 1/19 |
| DE | 102017205360 | B3 | * | 7/2018 | .......... H01M 50/502 |
| KR | 20160066349 | A | * | 6/2016 | ............. F02M 55/02 |
| KR | 20180086931 | A | * | 8/2018 | .............. F16L 13/02 |
| TW | 202026541 | A | * | 7/2020 | .............. F16B 19/02 |
| TW | 202220541 | A | * | 5/2022 | ............... B23K 1/00 |

* cited by examiner

PIN BRAZED MOUNTING ARRANGEMENT

TECHNICAL FIELD

The present disclosure relates generally to mechanical coupling arrangements, and more particularly to improved mounting arrangements for coupling mechanical components.

BACKGROUND

Industrial machinery often involves the implementation of sensors to monitor aspects and performance of machine operations. These can include, for example, vibration, temperature, current, pressure, moisture, and other types of industrial sensors. Many industrial sensors require installation at specific locations and/or orientations relative to machinery to be effective. For example, vibration sensors are often mounted directly to industrial motors that they are intended to monitor. This can involve mounting assemblies and arrangements that include threaded, magnetic, and/or adhesive based elements to facilitate serviceable and reliable mountings.

Unfortunately, there are significant drawbacks inherent to many conventional ways of mounting mechanical components to mechanical assets (e.g., sensors to industrial machinery). Threaded mountings require drilling and tapping openings directly into an industrial machine to be monitored, but such permanent invasive deformation can weaken the machine or otherwise be unpalatable for a machine operator. Magnetic and adhesive based couplings avoid such machine deformations but typically form mountings that are weaker and/or that degrade over time.

Although traditional ways of coupling sensors to industrial assets have worked in the past, improvements are always helpful. In particular, what is desired are improved mounting arrangements that facilitate coupling mechanical components to mechanical assets without the need for magnetic items, adhesives, or threaded openings in the mechanical assets.

SUMMARY

It is an advantage of the present disclosure to provide improved mounting arrangements that facilitate coupling mechanical components to mechanical assets without the need for magnetic items, adhesives, or threaded openings in the mechanical assets. The disclosed features, apparatuses, systems, and methods relate to pin brazed mounting arrangements configured to facilitate mounting mechanical components to mechanical assets. In particular, the disclosed embodiments can involve the use of a customized brazing pin and a mounting adapter. The customized brazing pin can be brazed directly to a mechanical asset and then modified to form a brazed stud. The mounting adapter can then be coupled to the brazed stud and the mechanical component can be coupled to the mounting adapter.

In various embodiments of the present disclosure, a pin brazed mounting arrangement can include a brazing pin and a mounting adapter. The brazing pin can have a neck, a lower portion with a brazing capsule located below the neck, and an upper portion located above the neck. The neck can be configured to facilitate removal of the upper portion after actuating the brazing capsule to braze the brazing pin to an outer surface of a separate mechanical asset to leave behind a brazed stud having a threaded region brazed to the outer surface of the separate mechanical asset. The mounting adapter can have a top surface, a bottom surface, a plurality of side surfaces, a first internally threaded region, and a second internally threaded region. The first internally threaded region can be proximate its bottom surface and configured to engage rotationally with the threaded region of the brazed stud to couple the mounting adapter to the brazed stud. The second internally threaded region can be proximate its top surface and configured to accept a rotational insertion therein of a threaded portion of a separate mechanical component to mount the separate mechanical component to the separate mechanical asset.

In various detailed embodiments, the separate mechanical asset can be an industrial motor and the separate mechanical component can be a vibration sensor. The lower portion of the brazing pin can include the brazing capsule, an initial offset region above the brazing capsule that is not threaded, and a threaded region above the initial offset region. The upper portion of the brazing pin can form a removable shank that includes an upper unthreaded region and an upper threaded region. Alternatively, the upper portion of the brazing pin can form a removable shank that is completely unthreaded. In some arrangements, the brazing pin can be formed by modifying an existing commercially available brazing pin, which can be an M8 threaded brazing pin. The neck can have a height of about 0.6 mm and a diameter of about 3.5 mm. The first internally threaded region and the second internally threaded region can be formed along a single internal opening that extends through the entire mounting adapter from the top surface to the bottom surface. The plurality of side surfaces on the mounting adapter can include a plurality of flat regions. In some arrangements, the mounting adapter can further include an enlarged internal opening between its bottom surface and the first internally threaded region. This enlarged internal opening can have a greater diameter than the diameter of the first internally threaded region and can be configured to accept therein an unthreaded region of the brazed stud that is below the threaded region of the brazed stud.

In further embodiments of the present disclosure, a mounting system can include a sensor and a pin brazed mounting arrangement. The sensor can have a sensor protrusion with a threaded portion configured to facilitate mounting the sensor to a separate mechanical asset that is larger than the sensor. The pin brazed mounting arrangement can be configured to be coupled to the sensor and can include a brazing pin and a mounting adapter. The brazing pin can have a neck, a lower portion with a brazing capsule located below the neck, and an upper portion located above the neck. The neck can be configured to facilitate removal of the upper portion after actuating the brazing capsule to braze the brazing pin to an outer surface of the separate mechanical asset to leave behind a brazed stud having a threaded region that is brazed to the outer surface of the separate mechanical asset. The mounting adapter can have a top surface, a bottom surface, a plurality of side surfaces, a first internally threaded region proximate its bottom surface configured to engage rotationally with the threaded region of the brazed stud to couple the mounting adapter to the brazed stud, and a second internally threaded region proximate its top surface configured to accept a rotational insertion therein of the threaded portion of the sensor such that the sensor is mounted to the separate mechanical asset.

In various detailed embodiments, the sensor can be a vibration sensor. Further, the lower portion of the brazing pin can include the brazing capsule, an initial offset region above the brazing capsule that is not threaded, and a threaded region above the initial offset region. The neck can have a height of about 0.6 mm and a diameter of about 3.5 mm. The first internally threaded region and the second internally threaded region can be formed along a single internal opening that extends through the entire mounting adapter from the top surface to the bottom surface. Also, the plurality of side surfaces on the mounting adapter can include a plurality of flat regions. In some arrangements, the mounting adapter can further include an enlarged internal opening between its bottom surface and the first internally threaded region. This enlarged internal opening can have a greater diameter than the diameter of the first internally threaded region and can be configured to accept therein an unthreaded region of the brazed stud that is below the threaded region of the brazed stud.

In still further embodiments of the present disclosure, various methods of mounting a mechanical component to a mechanical asset using a pin brazed mounting arrangement are provided. Pertinent process steps can include brazing a brazing pin, modifying the brazing pin, coupling a mounting adapter, and mounting a mechanical component. The brazing pin can be brazed to an outer surface of the mechanical asset using a brazing gun. The brazing pin can include a neck, a lower portion with a brazing capsule and threaded region located below the neck, and an upper portion located above the neck. The brazing pin can be modified after brazing to form a brazed stud having a threaded region that is brazed to the outer surface of the separate mechanical asset. The modifying can include removing the upper portion of the brazing pin after brazing. The mounting adapter can be coupled to the brazed stud by engaging a first internally threaded region proximate a bottom surface of the mounting adapter onto the threaded region of the brazed stud. The mechanical component can be mounted to the mounting adapter by rotationally inserting a threaded portion of the mechanical component into a second internally threaded region proximate a top surface of the mounting adapter.

In various detailed embodiments, the mechanical component can be a sensor and the mechanical asset can be an industrial motor. Additional process steps can include forming the brazing pin, preparing the outer surface of the industrial motor for brazing, cleaning the brazed regions of the industrial motor and brazing pin after brazing, adjusting the rotational orientation of the mounting adapter, and adjusting the rotational orientation of the sensor.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, and methods of use for pin brazed mounting arrangements and associated assemblies, devices, and systems. These drawings in no way limit any changes in form and detail that may be made to the disclosure by one skilled in the art without departing from the spirit and scope of the disclosure.

DETAILED DESCRIPTION

Figure 1A:
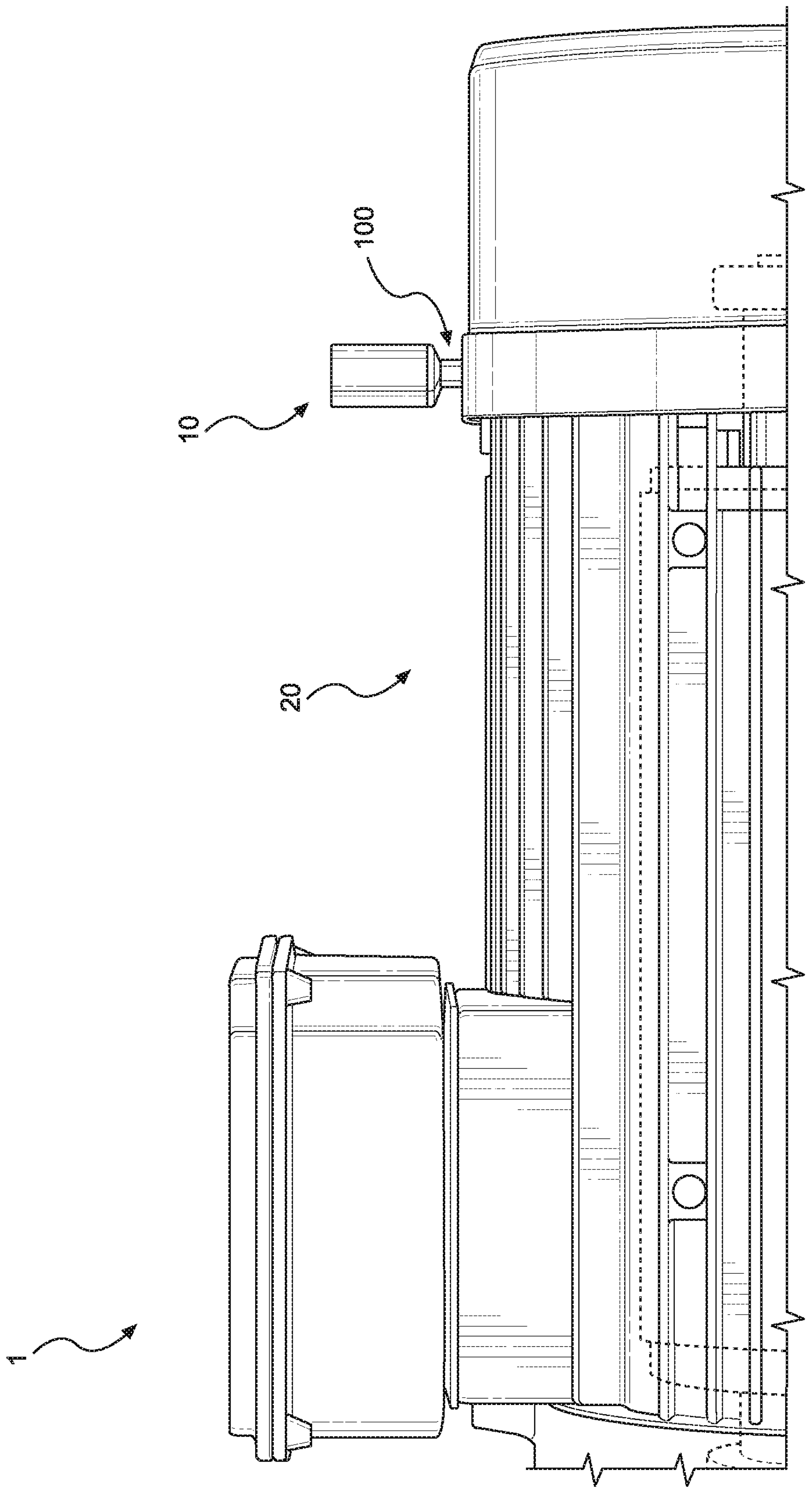
FIG. 1A illustrates in side elevation view an example environment with a mechanical component coupled to a mechanical asset using a pin brazed mounting arrangement according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods involving mounting arrangements. In particular, these can include mounting arrangements configured to mount a mechanical component to a mechanical asset using a pin brazed mounting arrangement. Such an arrangement can involve the use of a customized brazing pin that can be brazed directly to the mechanical asset. This customized brazing pin can be readily modified after brazing to leave only a brazed stud on the mechanical asset. The disclosed pin brazed mounting arrangements can also include a mounting adapter configured to couple with both the brazed stud and the mechanical component. In specific arrangements, the mechanical component can be an industrial sensor, such as a vibration sensor, while the mechanical asset can be industrial mechanical equipment, such as an industrial motor.

As will be readily appreciated by those of skill in the art, the use of some industrial sensors can depend heavily on a sensor being installed properly with respect to its monitored or tracked industrial equipment item or other asset. Proper installation of a sensor can involve the correct placement, mounting, fixture stiffness, and rotational alignment with respect to its tracked item, among other factors. As one example, many types of standard vibration sensors operate accurately when they are mounted directly to an industrial equipment item that they are monitoring, with such mounting being at an optimal location on the item as well as an optimal relative rotational orientation with respect to the item being monitored for vibration.

Various mounting techniques, assemblies, and arrangements can be used to couple a mechanical component to a mechanical asset. These can include mounting assemblies and arrangements having magnetic items, adhesives, and/or threaded or unthreaded openings formed in mechanical asset, among other components and features. Some techniques and arrangements for mounting a mechanical component to a mechanical asset can be found in, for example, U.S. patent application Ser. No. 19/297,904 filed on Aug. 12, 2025, titled "SELF-ALIGNING THREADED MOUNTING ASSEMBLY," U.S. patent application Ser. No. 19/314,997 filed on Aug. 29, 2025, titled "ADHESIVE-FREE ENCAPSULATED MAGNETIC MOUNTING BASE," U.S. patent application Ser. No. 19/324,315 filed on Sep. 10, 2025, titled "EXPANDABLE INSERT BASED MOUNTING ASSEMBLY," and U.S. patent application Ser. No. 19/546,105 filed on Feb. 20, 2026, titled "MOUNTING ASSEMBLY WITH REDUCED FRICTION ELEMENT," which applications are hereby incorporated by reference in their entireties herein.

As noted above, many conventional mounting methods can have some unfortunate drawbacks. For example, threaded mountings can often require drilling and tapping openings directly into a machine housing. Some machine housings can be thin-walled or pressure-retaining such that forming openings is not feasible. Even where possible, forming openings can increase the risks of cracking, leakage, and/or warranty voiding. Forming openings can also permanently alter a machine and may not be aesthetically pleasing, which can also bias a machine owner into not using this mounting approach. Adhesive and magnetic based mountings can depend strongly on surface preparation, operator techniques, and environmental conditions during adhesive curing, among other factors. Adhesive performance can degrade over time due to temperature, humidity, chemical exposure, long term vibrations, and other industrial factors. Adhesive curing time also can delay commissioning and increase machine downtime, which are other reasons that may bias a machine owner into using these mounting approaches. As a result of these and other issues, there does not currently exist a universal, fast, and robust mounting approach that delivers screw-like mechanical performance without invasive machining, process variability, or both.

The disclosed embodiments provide a mounting solution involving a pin brazing joint as a standardized mechanical and electrical interface for attaching sensors to industrial machines in a non-invasive manner. A brazing pin with a metallic stud and silver-based filler can be brazed onto a prepared area of the machine surface. This brazing process can create a permanent metallurgical joint between the stud and the surface without melting the base material of the industrial motor or other mechanical asset. After brazing, a shank upper portion of the brazing pin can be removed to leave only a short threaded metallic brazed stud behind. A mounting adapter can then engage the brazed stud on one side and the sensor on the other side to provide a strong mechanical mounting of the sensor to the machine. This mounting arrangement can also provide a defined and rigid vibration path, which can be particularly useful for applications of a vibration sensor mounted to an industrial motor.

Although various embodiments disclosed herein discuss the specific application of mounting a vibration sensor to an industrial motor or engine, it will be readily appreciated that the disclosed features, apparatuses, systems, and methods of use for pin brazed mounting arrangements can also be used in other applications and environments where mounting a separate mechanical component to a separate mechanical asset is desired. While the disclosed mounting arrangements specifically include unique brazing pins and coupling assemblies, it will be understood that other components and variations can alternatively be used to facilitate coupling a mechanical component to a mechanical asset in a reliable manner. Furthermore, while some examples are provided for specific tools, components, features, and materials, it will be understood that these can be replaced with any suitable substitute or alternative tools, components, features and/or materials that take advantage of the disclosed pin brazed mounting arrangements and their various components. Other applications, arrangements, and extrapolations beyond the illustrated embodiments are also contemplated.

Referring first to FIG. 1A, an environment with a mechanical component coupled to a mechanical asset using a pin brazed mounting arrangement is illustrated in side elevation view. Industrial environment 1 can include a relatively smaller mechanical component 10 that is mounted to a relatively larger mechanical asset 20 by way of mounting arrangement 100, which can be a suitable pin brazed mounting arrangement as set forth herein. In various arrangements, mechanical component 10 can be a sensor, such as a vibration sensor, for example. Other types of sensors are also possible, such as, temperature, current, pressure, and moisture sensors, with other types of mechanical components suitable for mounting also being possible. In various arrangements, mechanical asset 20 can be a manufacturing or industrial item, such as an industrial motor, although other types of mechanical assets are also possible.

As noted above, a variety of different mounting techniques, assemblies, and arrangements can be used to mount the same or a substantially similar mechanical component 10 to the same or a substantially similar mechanical asset 20. Such mounting arrangements can result in a mounting that appears the same or substantially similar to industrial environment 1. These can include, for example, mounting arrangements having magnetic items, adhesives, and/or threaded or unthreaded openings formed in mechanical asset.

Figure 1B:
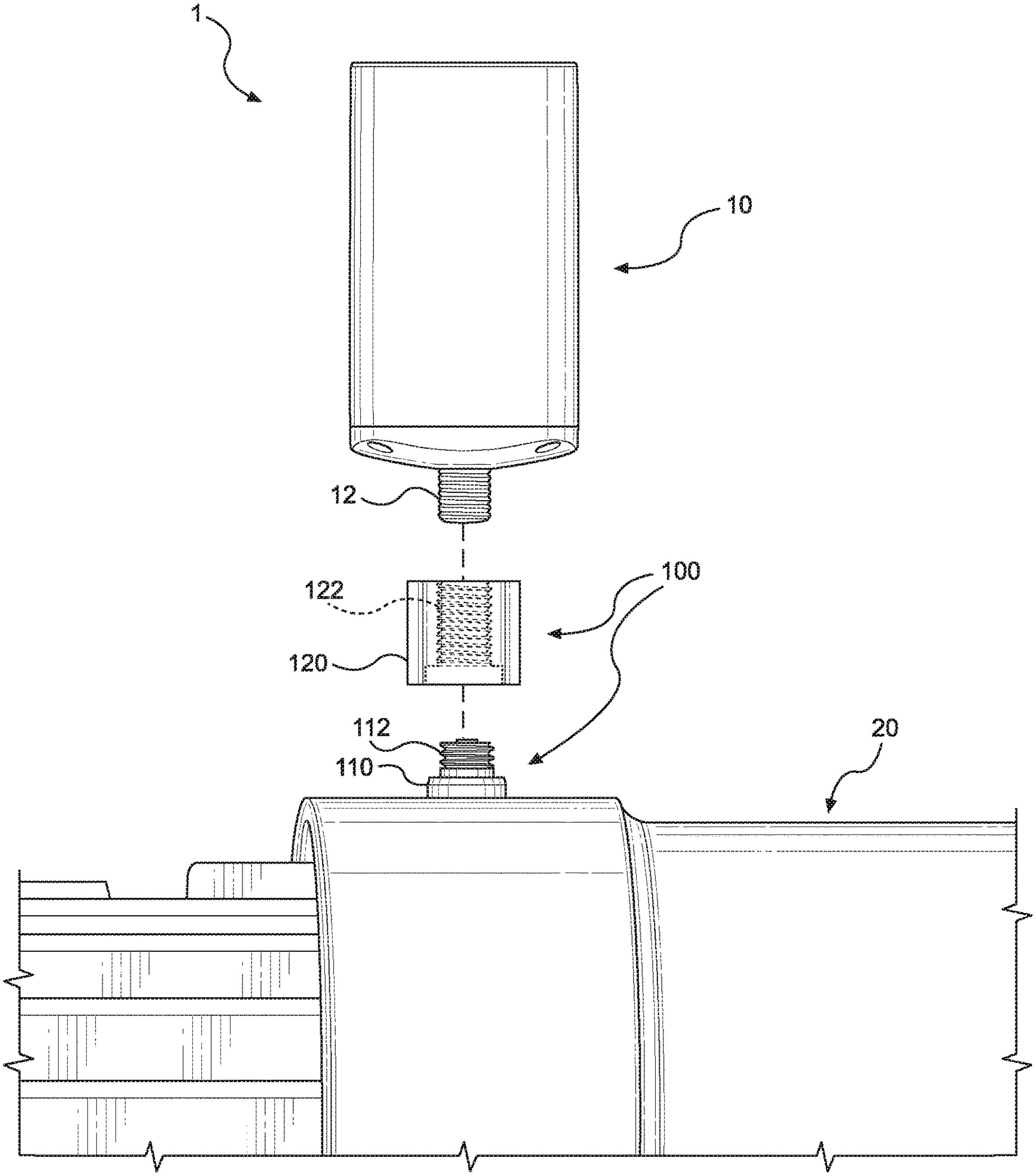
FIG. 1B illustrates in side exploded close-up view the environment of FIG. 1A with the mechanical component, mechanical asset, and pin brazed mounting arrangement all uncoupled according to one embodiment of the present disclosure.

FIG. 1B illustrates in side exploded close-up view the environment of FIG. 1A with the mechanical component, mechanical asset, and pin brazed mounting arrangement all uncoupled from each other. In some arrangements, mechanical component 10 and mechanical asset 20 can be separate items that are already available with a desire to mount, attach, or otherwise couple the mechanical component to the mechanical asset, such as by way of using pin brazed mounting arrangement 100. Mechanical component 10 can be relatively smaller compared with mechanical asset 20 such that coupling these items together can involve moving and mounting a vibration sensor or other smaller portable mechanical component onto an industrial motor or other larger stationary mechanical asset.

In various embodiments, pin brazed mounting arrangement 100 can be attached or coupled to both mechanical component 10 and mechanical asset 20, and this can involve one or more features on all of these items. Mechanical component 10 can have a threaded post or portion 12 extending outward from a bottom region thereof, which can be standard or readily available features on the mechanical component. For example, many vibration sensors can have a built-in threaded post designed for mounting or coupling the sensor to another item. Mechanical asset 20 can have an outer surface suitable for brazing, such as a metal, relatively flat, and relatively clean outer surface. This outer surface can have some amount of curvature or irregularity so long as this does not prevent a traditional brazing process.

Pin brazed mounting arrangement 100 can include brazed stud 110 and mounting adapter 120, among other possible components. Brazed stud 110 can be brazed to the outer surface of mechanical asset 20 such that a permanent metallurgical joint is formed between the brazed stud and outer surface, as will be readily understood by those of skill in the art. In some arrangements, brazed stud 110 can be formed by brazing a customized brazing pin to the outer surface of mechanical asset 20 using a brazing gun in a conventional manner and then breaking off or otherwise removing an unwanted upper portion or shank of the customized brazing pin to leave only the brazed stud behind, as set forth in greater detail below.

Brazed stud 110 can be brazed such that a short threaded portion 112 protrudes away orthogonally from the outer surface of mechanical asset 20. Mounting adapter 120 can include a threaded inner opening 122 configured to receive both short threaded portion 112 of brazed stud 110 and threaded portion 12 of mechanical component 10. Threaded inner opening 122 can facilitate directly attaching or otherwise coupling mounting adapter 120 onto brazed stud 110, such as by inserting short threaded portion 112 into threaded inner opening 122 and rotating the mounting adapter onto the short threaded portion. Threaded inner opening 122 can also facilitate directly attaching or otherwise coupling mechanical component 10 onto mounting adapter 120, such as by rotational insertion of threaded portion 12 into the threaded inner opening. In some arrangements, this threaded inner opening 122 can be broken up into distinct regions or separate openings for the brazed stud and for the mechanical component threaded portion, as noted below.

Figure 2:
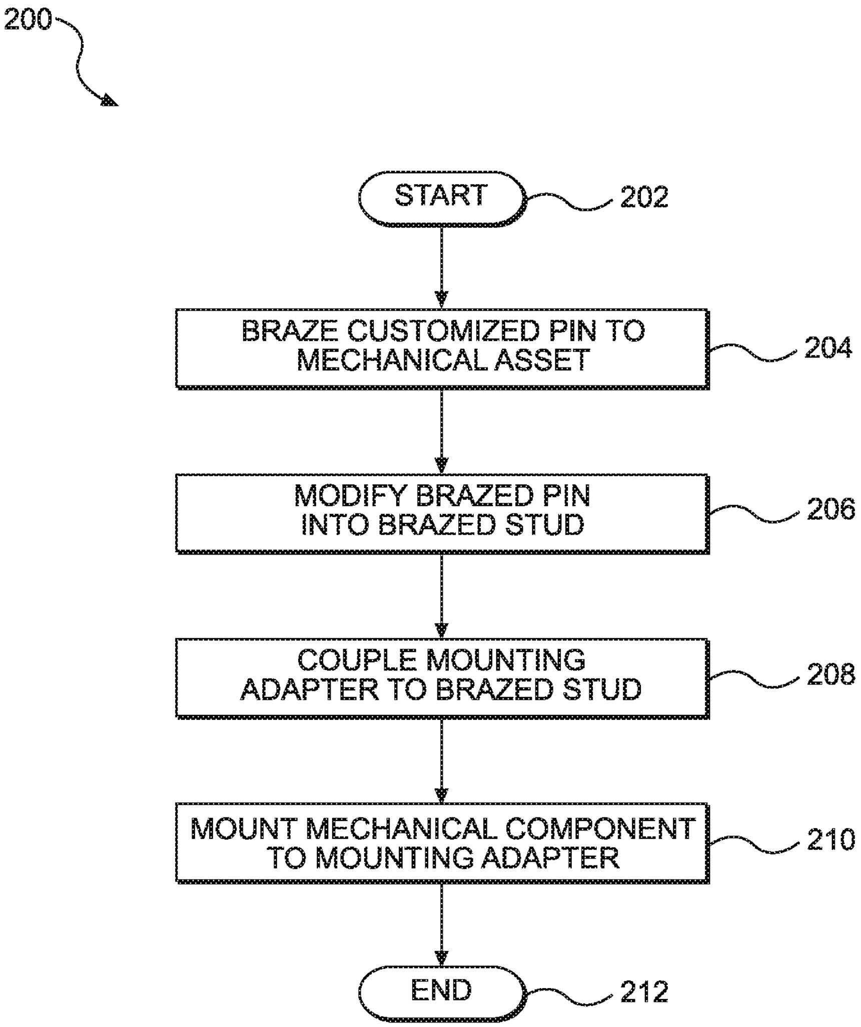
FIG. 2 illustrates a flowchart of an example summary method of mounting a mechanical component to a mechanical asset using a pin brazed mounting arrangement according to one embodiment of the present disclosure.

Moving next to FIG. 2, a flowchart is provided of an example summary method of mounting a mechanical component to a mechanical asset using a pin brazed mounting arrangement. Summary method 200 can represent one broad aspect of various overall methods of mounting a mechanical component to a mechanical asset, and it will be understood that various other steps and details of such a broad aspect and overall methods are not provided here for purposes of simplicity. While summary method 200 and other disclosed methods can involve mounting a vibration sensor to an industrial motor, for example, it is also contemplated that the various disclosed methods can alternatively be applied to other types of mechanical components and mechanical assets.

After a start step 202, an initial process step 204 can involve brazing a customized brazing pin to a mechanical asset. This can involve a conventional brazing process using a brazing gun and other brazing equipment to braze the customized pin to a suitable surface on the mechanical asset. The customized brazing pin can include a neck, a lower portion with a brazing capsule and threaded region located below the neck, and an upper portion located above the neck, among other features, as set forth in greater detail below.

At a subsequent process step 206, the customized brazing pin can be modified to result in only a brazed stud having a threaded region being brazed to an outer surface of the mechanical asset. This can involve, for example, breaking off or otherwise removing an unwanted top portion or shank of the brazing pin. The top portion may be necessary to be able to implement a conventional brazing process using a brazing gun, as will be readily appreciated by those of skill in the art.

At the next process step 208, a mounting adapter can be coupled to the brazed stud. This can involve engaging a first internally threaded region proximate a bottom surface of the mounting adapter onto the threaded region of the brazed stud. For example, the mounting adapted can be rotated onto the brazed stud after the threaded regions are engaged.

Following process step 210 can involve mounting a mechanical component to the mounting adapter. This can involve rotationally inserting a threaded portion of the mechanical component into a second internally threaded region proximate a top surface of the mounting adapter, for example. In some arrangements, one or both of steps 208 and 210 can also involve rotationally orienting and torquing components to facilitate proper mountings.

Summary method 200 can then end at end step 212. As noted above, the mechanical component and mechanical asset can be separate items from each other and also separate from the pin brazed mounting arrangement, which can be used to mount one of these separate items to the other. In some arrangements, one or more of the foregoing steps can be performed simultaneously or in a different order. For example, step 210 can be performed before step 208 in some arrangements. Not all steps are necessary in all situations, and additional steps and details can be added. For example, an added optional process step can involve forming the threadless opening in the mechanical asset. Further steps, details, and variations are provided in detailed method 900 set forth below.

Figure 3A:
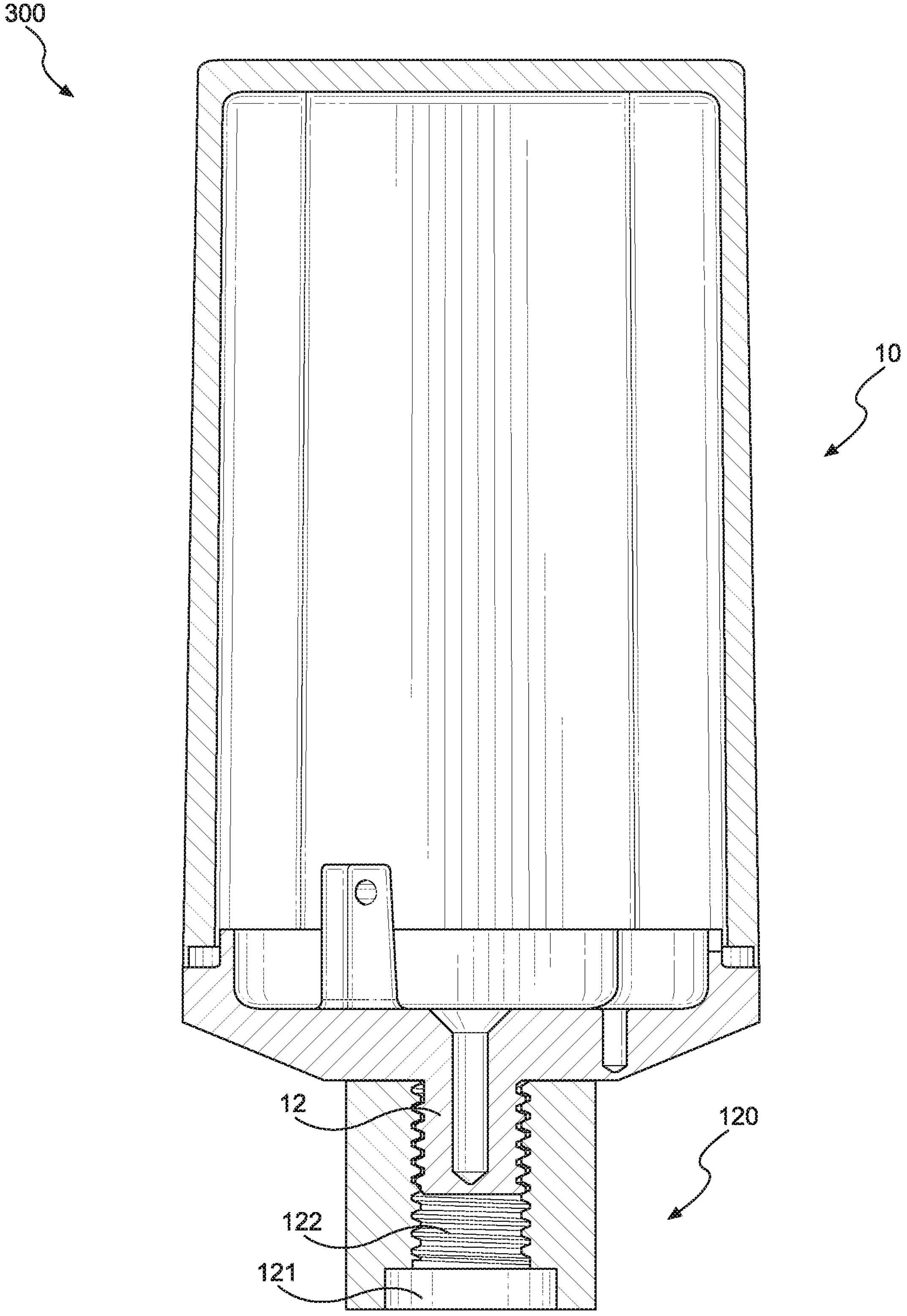
FIG. 3A illustrates in side cross-section view an example arrangement of a mechanical component coupled to a mounting adapter of a pin brazed mounting arrangement according to one embodiment of the present disclosure.

Continuing with FIG. 3A, an example arrangement of a mechanical component coupled to a mounting adapter of a pin brazed mounting arrangement is illustrated in side cross-section view. Arrangement 300 can include mechanical component 10, which can be a vibration sensor, for example, and mounting adapter 120. Various internal items and features of mechanical component 10 are not shown here for purposes of simplicity in illustration. In some embodiments, mounting adapter 120 can be coupled to mechanical component 10 before mounting both of these items together to a brazed stud, while other embodiments can involve coupling the mounting adapter to the brazed stud before attaching mechanical component 10. As noted above, mounting adapter 120 can include a threaded inner opening 122 that can be configured to receive threaded protrusion 12 of mechanical component 10 at an upper region of the inner opening and a threaded portion of a brazed stud at a lower region of the inner opening.

In some arrangements, mounting adapter 120 can also include an enlarged internal opening 121 between its bottom surface and a first internally threaded region (e.g., the lower region of threaded inner opening 122). As shown, enlarged internal opening 121 can have a greater diameter than the diameter of threaded inner opening 122. Enlarged internal opening 121 can have a geometry that is configured to accept an unthreaded region of the brazed stud that is below the threaded region of the brazed stud, such that more than just the threaded region of the brazed stud is inserted into mounting adapter 120.

Figure 3B:
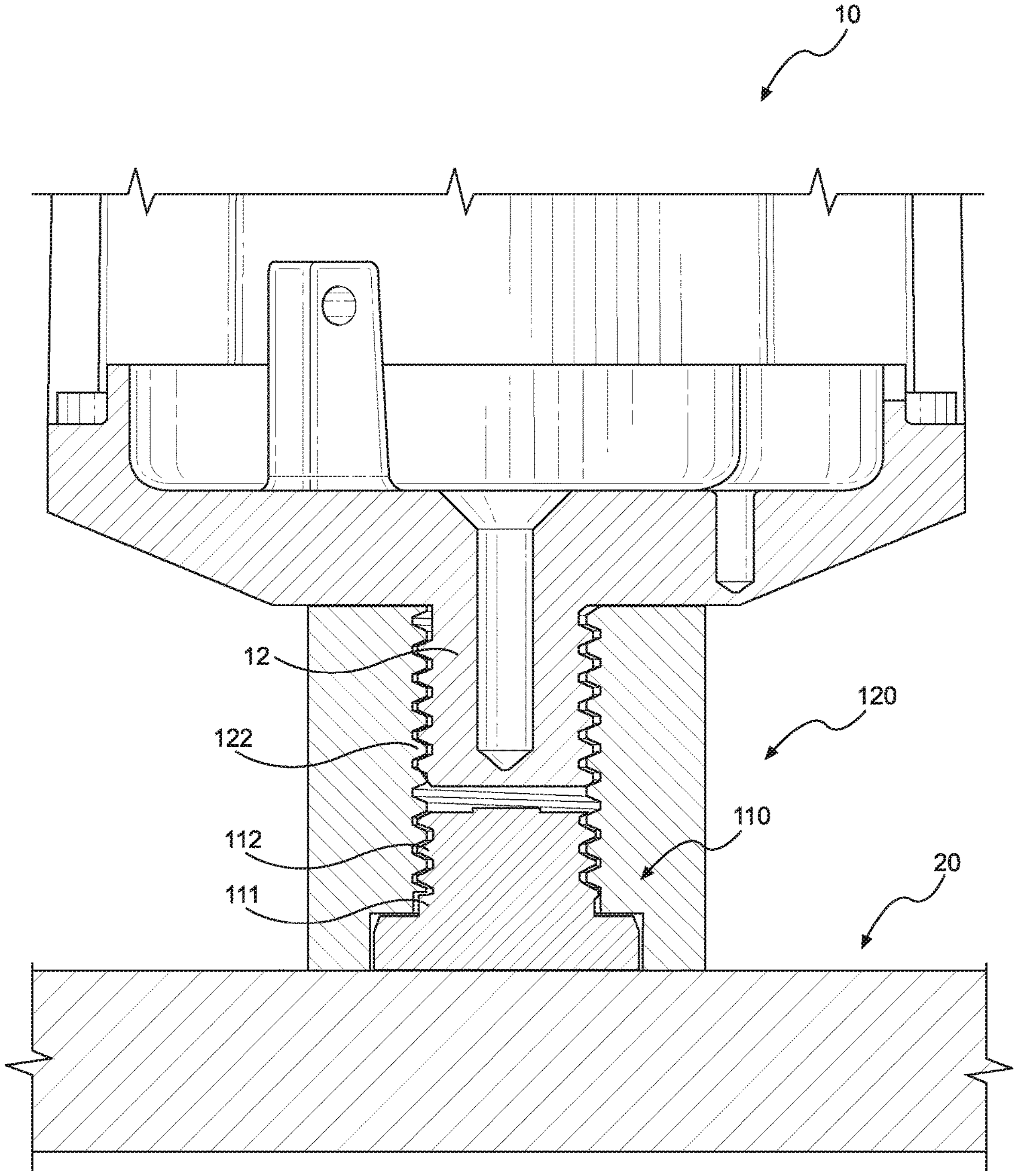
FIG. 3B illustrates in close up side cross-section view the arrangement of FIG. 3A mounted to brazed stud that is brazed to a mechanical asset according to one embodiment of the present disclosure.

FIG. 3B illustrates in close up side cross-section view the arrangement of FIG. 3A mounted to brazed stud that is brazed to a mechanical asset. As shown, brazed stud 110 can be brazed to an outer surface of mechanical asset 20. Brazed stud 110 can include an initial offset region 111 that is not threaded below a threaded region 112 that engages with the thread of threaded inner opening 122 on mounting adapter 120. In some arrangements, the enlarged internal opening of mounting adapter can be configured such that only initial offset region 111 fits within this space, while in other arrangements the enlarged internal opening can be configured to accept some or all of a brazing capsule at the bottom of brazed stud 110. This can result in the bottom surface of mounting adapter contacting flush against the outer surface of mechanical asset 20 as shown or being elevated slightly above the outer surface depending on the geometries of the enlarged internal opening and the brazing capsule. It will be understood that enlarged internal opening 121 shown in FIG. 3A can be resized to be smaller or larger as necessary to accommodate whatever portions of brazed stud 110 are to be contained within mounting adapter 120 when all items are assembled and mounting is complete.

As shown, threaded inner opening 122 of mounting adapter can extend all the way through the mounting adapter from its top surface to its bottom surface and can be configured to engage with both threaded protrusion 12 of mechanical component 10 and threaded portion 112 of brazed stud 110. As such, a first internally threaded region of threaded inner opening 122 can be proximate the bottom surface of mounting adapter 120 while a second internally threaded region of the threaded inner opening can be proximate the top surface of the mounting adapter. The first internally threaded region can be configured to engage rotationally with the threaded region 112 of brazed stud 110 to couple mounting adapter 120 to the brazed stud, while the second internally threaded region can be configured to accept a rotational insertion therein of threaded protrusion 12 such that mechanical component 10 is coupled to the mounting adapter and thus mounted to mechanical asset 20. In some arrangements, threaded inner opening 122 can have a thread that is consistent all the way through, such as a standard M8 thread, for example. The threads on threaded protrusion 12 and threaded region 122 can correspondingly also be M8 threads. Alternatively, threaded inner opening 122 can be a standard M6 or ¼ inch thread, and the threads on threaded protrusion 12 and threaded region 112 can be adjusted to match these alternative threads. It is also possible for one set of threads to be one size or standard while the other set of threads are a different size or standard. Other sizes and types of threads are also possible as may be desired for a given design.

In some alternative arrangements (not shown), mounting adapter 120 can have first and second internally threaded regions that are not formed along a common and continuous threaded inner opening. For example, first and second internally threaded regions can be formed independently into the bottom and top surfaces of mounting adapter 120 without meeting in the middle. These first and second internally threaded regions can have different sized or threaded arrangements and can be offset from each other in alternative designs as may be desired.

In various embodiments, the geometries and materials of brazed stud 110 and mounting adapter 120 can be chosen such that the overall mounting arrangement has a high natural frequency, which can provide a significant advantage for vibration sensor applications. Such a high natural frequency can be about 8-10 kHz, for example, which can ensure high fidelity vibration measurements where mechanical component 10 is a vibration sensor.

As will be readily appreciated due to the nature of conventional brazing, the disclosed pin brazed mounting arrangement can also function as an electrical reference for mechanical component 10. For example, sensor or mechanical component 10 can be grounded or shielded electrically through the pin brazed mounting arrangement and into mechanical asset 20, which can have a suitable grounding or other electrical arrangement formed elsewhere thereon and connected to the outer surface at the brazed location.

Several significant advantages can be realized with the final mounting arrangement shown in FIG. 3B and noted variations thereof. As noted above, the disclosed pin brazed mounting arrangement is noninvasive to the mechanical asset in that no drilling, tapping, or welding takes place to disfigure the mechanical asset. A metallurgical bond is formed at the asset surface by way of brazing such that the mechanical asset material is not melted or overheated, and the brazing process can be suitable even for thin or otherwise sensitive machine housings where the formation of openings or other disfiguring is not acceptable.

Another advantage is that relatively few process steps are needed to complete the mounting process. These can involve local surface cleaning or prepping of the asset surface where brazing is to occur, positioning the brazing pin and firing the brazing gun, removing a ceramic brazing ferrule and cleaning any unwanted stray brazing residue, and then installing the mounting adapter and sensor or other mechanical component. There is no need for forming openings in the mechanical asset, extended machining operations, or lengthy curing times where adhesives are used.

Further advantages include the high repeatability of the installation process and the relatively low level of operator skill needed for installation. As is generally well-known, a traditional pin brazing operation using a brazing gun involves predefined parameters and standardized geometries that are not complex and do not require specialized skills such as that which may be required for full welding procedures. This can minimize variations between installation operators and strongly reduces the risks of poor surface preparation, misalignment, and other factors requiring greater skill levels. Greater installation consistency and reliability can thus be achieved across different units, sites, and time periods.

Still further advantages include increased installation speeds and reduced physical efforts. The installation process can involve a short pin brazing cycle with a portable brazing gun and simple equipment such that fewer manual operations are required from installation operators, especially in overhead or difficult to reach locations. The repeatable process and reduced number of overall steps can allow for a significantly higher number of sensors or other mechanical components to be installed by an operator in a given time period while also lowering operator fatigue and ergonomic load.

As yet another advantage, the metallurgical joint created by pin brazing can be resistant to vibration, temperature, cycling, chemicals, and moisture, among other hostile industrial environmental factors. This can result in long term robustness of the mounting with improved mechanical and electrical stability when compared to typical adhesive based mounting arrangements, for example. Other advantages and benefits of the disclosed pin brazed mounting arrangements are also possible, as will be readily appreciated.

Figure 4:
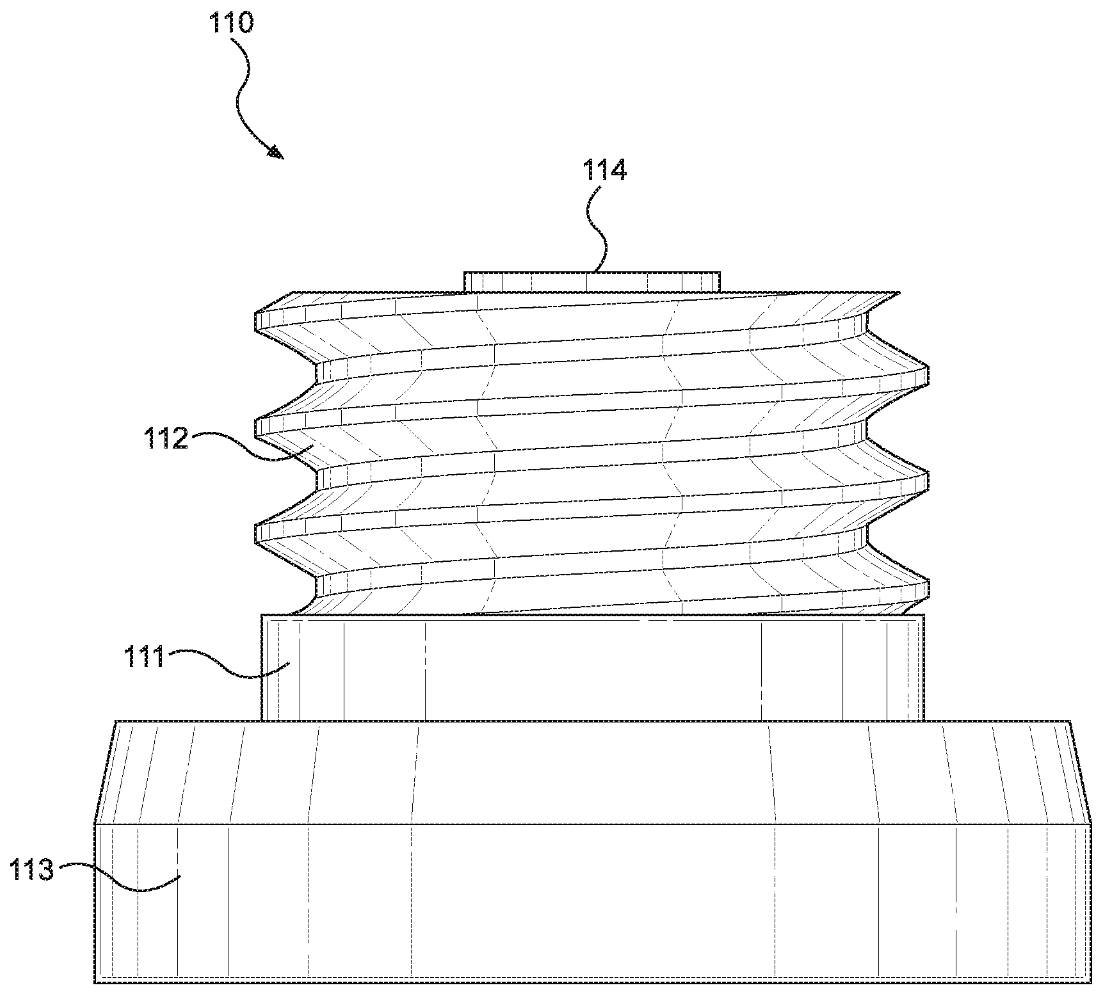
FIG. 4 illustrates in side elevation view an example brazed stud of a pin brazed mounting arrangement according to one embodiment of the present disclosure.

Turning next to FIG. 4, an example brazed stud of a pin brazed mounting arrangement is shown in side elevation view. Again, brazed stud 110 can be the portion of a brazing pin that is left behind on a mechanical asset after brazing and removal of an upper portion or shank of the brazing pin. As will be readily appreciated, conventional brazing systems and techniques using a brazing gun are not able to braze a shortened stud such as brazed stud 110 by itself, such that a longer brazing pin having a removable shank must be used to facilitate a proper brazing. Brazed stud 110 can include an initial offset region 111 that is not threaded directly below a threaded region 112 that is configured for engaging with a internally threaded region on a mounting adapter as noted above. Brazed region 113 can be below initial offset region 111 and represents the result from brazing capsule firing after the brazing pin is brazed to an outer surface of the mechanical asset.

Burr 114 can be present at the top of brazed stud 110 and can be that which remains after a neck of the brazing pin is broken to remove the shank or upper portion of the brazing pin. In some arrangements, burr 114 can be insignificant and can be ignored without consequence, while in some situations this nub can be removed if it is too large or might otherwise interfere with attaching the mounting adapter. If desired, removal of burr 114 can be accomplished by way of a file, wire brush, or other suitable metal cleaning tool, as will be readily appreciated.

Figure 5:
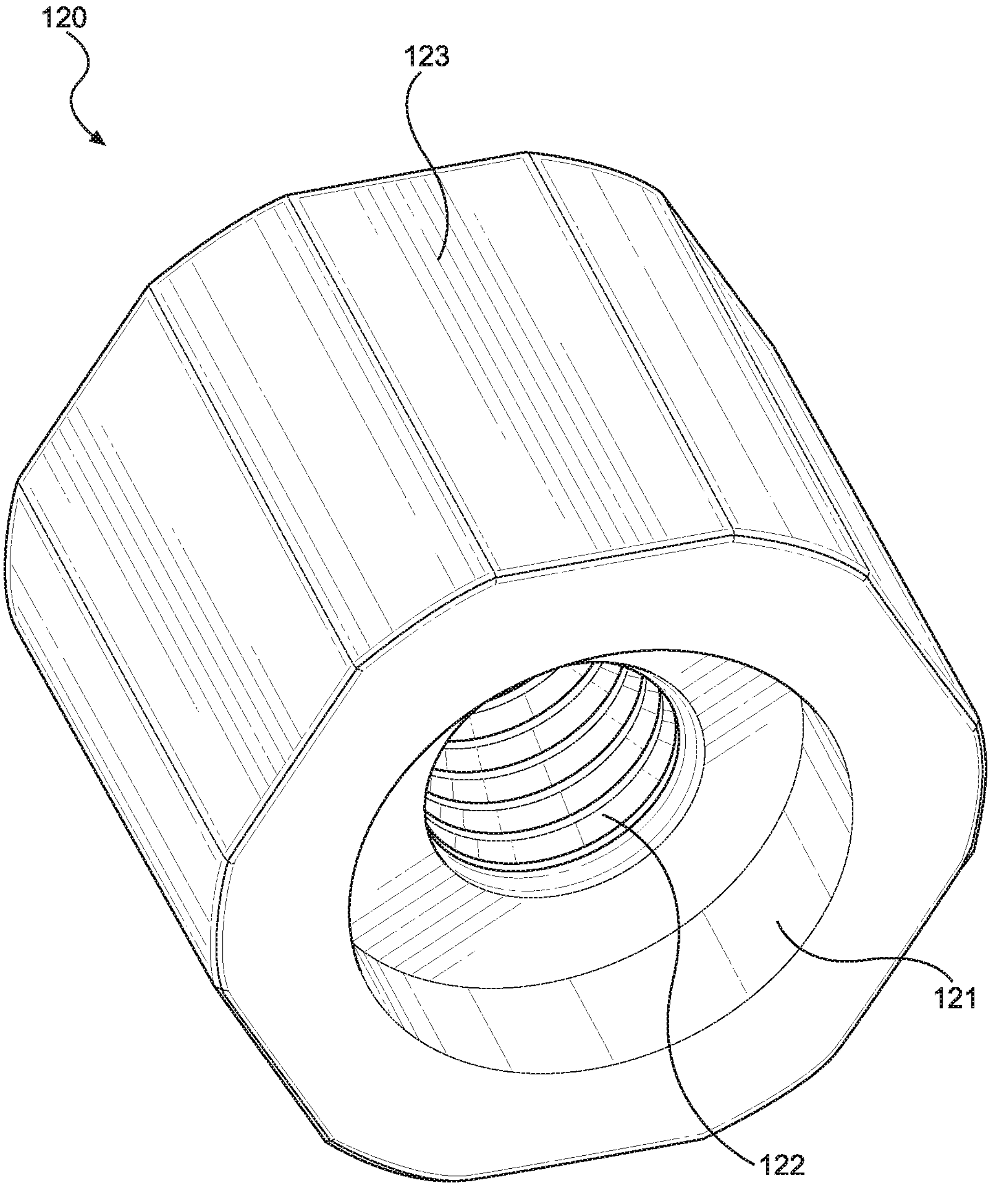
FIG. 5 illustrates in bottom perspective view an example mounting adapter of a pin brazed mounting arrangement according to one embodiment of the present disclosure.

Continuing with FIG. 5 an example mounting adapter of a pin brazed mounting arrangement is illustrated in bottom perspective view. Again, mounting adapter 120 can include enlarged internal opening 121 just inside its bottom surface and threaded inner opening 122 that can extend through the full height of the mounting adapter from top to bottom. Enlarged internal opening 121 can have a geometry that is configured to accept an unthreaded region of the brazed stud that is below the threaded region of the brazed stud, such that more than just the threaded region of the brazed stud is inserted into mounting adapter 120. This unthreaded region of the brazed stud can include all or part of a spent brazing capsule, as noted above.

Mounting adapter 120 can also include multiple outer surfaces that can include flat regions 123 as shown. In some arrangements, there can be six flat regions 123 evenly spaced around the circumference of mounting adapter 120. More or fewer flat regions 123 are also possible. Flat regions 123 can be configured to accommodate a wrench or other suitable tool to rotate and torque mounting adapter 120 during an installation process. In some arrangements, mounting adapter 120 can be a simple part that is integrally formed as a single piece, while in other arrangements the mounting adapter can be formed from multiple parts. For example, mounting adapter 120 can include an outer sleeve and an insert that is press fit or otherwise fixed within the outer sleeve. Various examples of such an alternative arrangement for a mounting adapter can be extrapolated from that which is found in U.S. patent application Ser. No. 19/546,105 filed on Feb. 20, 2026, titled "MOUNTING ASSEMBLY WITH REDUCED FRICTION ELEMENT," which application is again incorporated by reference herein.

Figure 6:
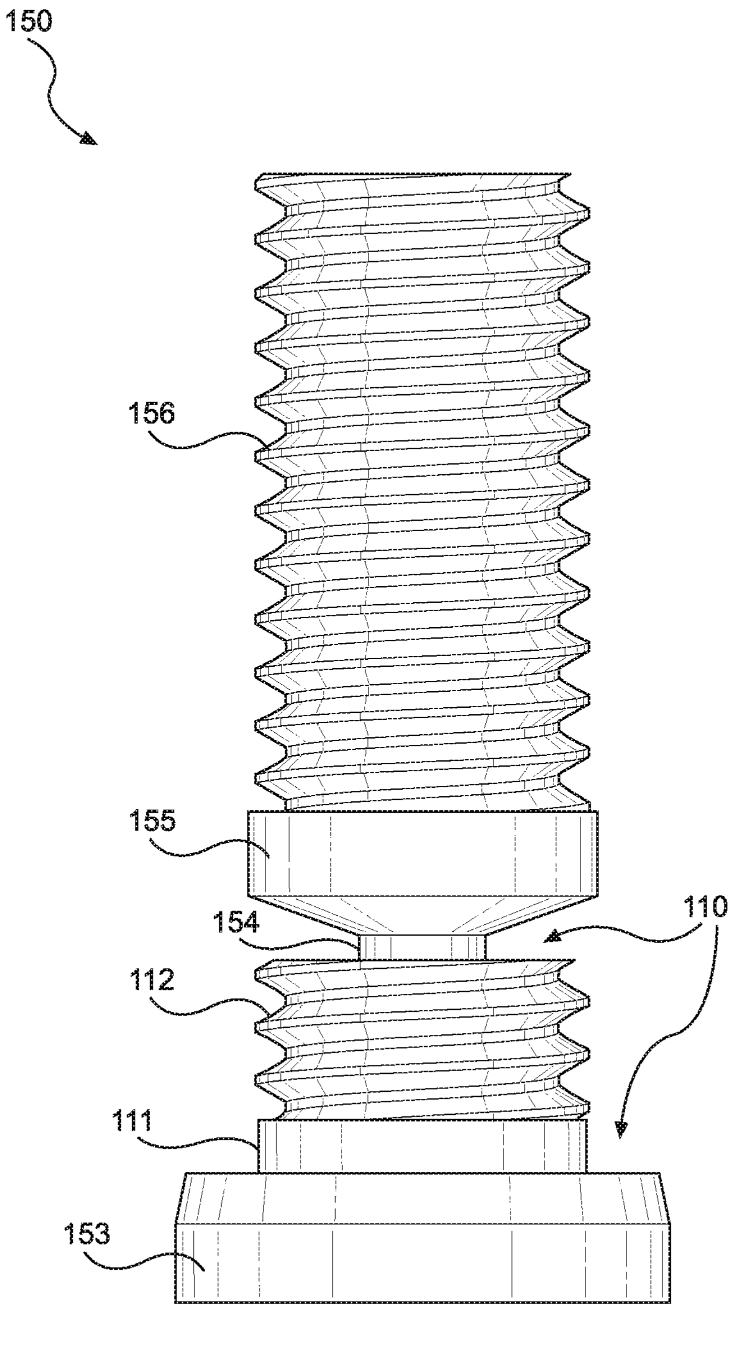
FIG. 6 illustrates in side elevation view an example customized brazing pin used to form a pin brazed mounting arrangement according to one embodiment of the present disclosure.

FIG. 6 illustrates in side elevation view an example customized brazing pin used to form a pin brazed mounting arrangement. Brazing pin 150 can include a lower portion and an upper portion that can be separated by neck 154. The lower portion can include all regions and features that result in a brazed stud 110, and the upper portion can be broken off at neck 154 after brazing to result in only the brazed stud being brazed to an outer surface of a mechanical asset. The lower portion or brazed stud region can include an initial offset region 111 that is not threaded below a threaded region 112 that is configured for mounting a separate component thereto, such as a mounting adapter as noted above.

Brazing pin 150 can also include a brazing capsule 153 located below initial offset region 111 at the lower portion of the brazing pin. Brazing capsule 153 can be any traditional brazing capsule configured for a gun based brazing process. As such, brazing capsule 153 can include a flux material contained within a suitable metal (e.g., silver) capsule below a suitable brazing alloy, as will be readily appreciated by those of skill in the art. Brazing capsule 153 can be an unfired capsule on a new brazing pin 150, while brazed region 113 as noted above on brazed stud 110 can be the brazing capsule after the brazing pin is brazed to an outer surface of the mechanical asset.

The upper portion of brazing pin 150 can form a removable shank that includes upper unthreaded region 155 and upper threaded region 156. After brazing pin 150 has been brazed to an outer surface of the mechanical asset, the brazed pin can be modified by removing this shank containing upper unthreaded region 155 and upper threaded region 156. Removal can be facilitated by twisting, cutting, hammering, or otherwise applying a suitable lateral force against the removable shank such that it breaks off from the brazed pin due to the narrow geometry of neck 154. Removal of this shank or upper portion can then result in only a brazed stud 110 remaining on the mechanical asset, with this brazed stud being suitable for mounting a sensor or other mechanical component thereto.

In some embodiments, brazing pin 150 can have similar materials and geometries that can correspond to a commercially available M8 threaded brazing pin, for example. As such, brazing capsule 153 can be a standard M8 threaded brazing capsule, while all other portions of brazing pin 150 can be brass. The diameter of brazing pin 150 from initial offset region 111 to the top of upper threaded region 156 can be about 8 mm, for example, and the total height of the pin can be about 26 mm, although other heights are also possible as may be suitable for use with a conventional brazing gun. Neck 154 can have a height of about 0.6 mm and a reduced diameter of about 3.5 mm to facilitate breaking off the upper portion at the neck after brazing. Other sizes, threads, and dimensions for brazing pin 150 and neck 154 are also possible. For example, brazing pin 150 can alternatively be a M6, M10, M12, or ¼ inch threaded brazing pin, and neck 154 can alternatively be dimensioned to be taller, shorter, narrower, or wider, as may be desired for a given design.

As will be readily appreciated, the process of brazing can result in the spread of brazing material and contaminants around the brazed region. Because it is desirable to have a threaded portion of the brazed pin close to the surface of the mechanical asset to facilitate a mechanical coupling with the mounting adapter, it can be problematic when brazing material and contaminants from the brazing process get into threads that are low on the pin. Accordingly, initial offset region 111 can be formed to account for these contaminants that result from the brazing process, since it can be much easier to clean or remove these contaminants from an unthreaded pin region than from a threaded region where removal can damage the threads. In some arrangements, initial offset region 111 can have a height of about 1-2 mm to account for brazing material splash that can be easily cleaned from this initial offset region while threaded region 112 remains uncontaminated. In specific arrangements, initial offset region 111 can have a height of about 1.25 mm, although other heights for this region are also possible.

Figure 7A:
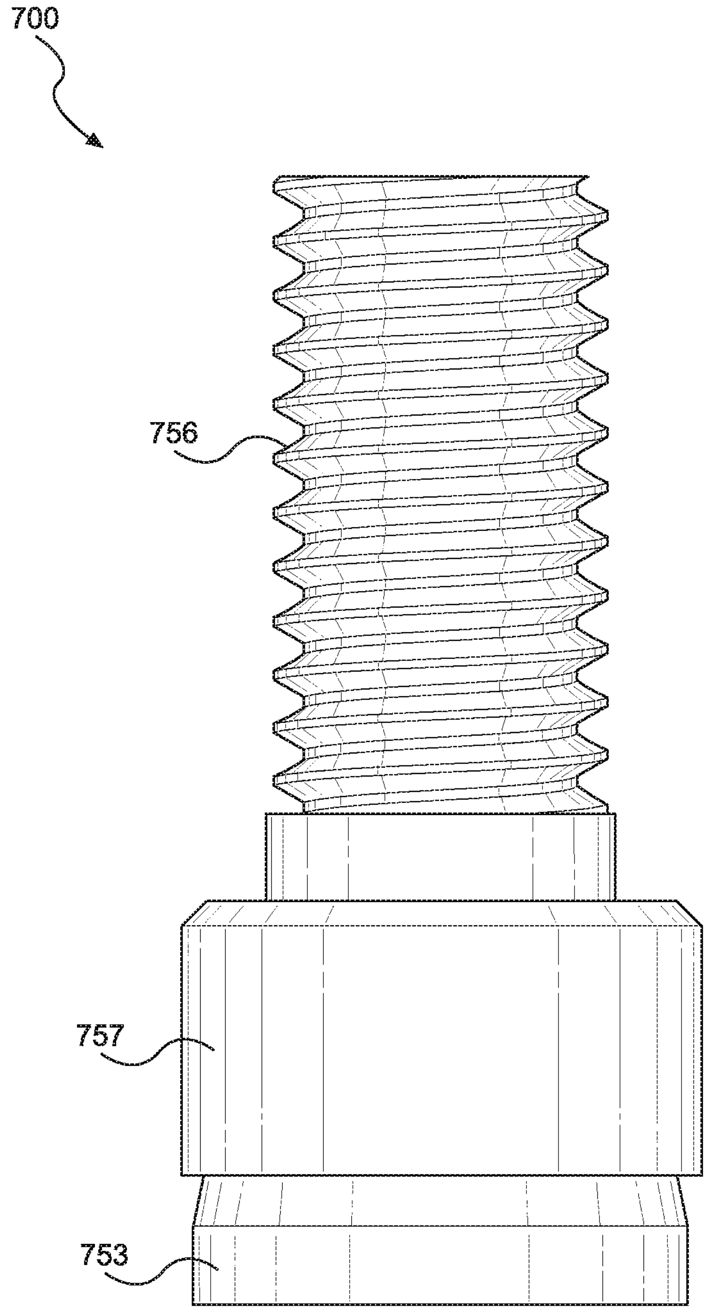
FIG. 7A illustrates in side elevation view an example commercial brazing pin used to form a pin brazed mounting arrangement according to one embodiment of the present disclosure.

In some embodiments, brazing pin 150 can be created as an original customized unit, such as by coupling a standard brazing capsule 153 to a brass pin with all other features integrally formed therein to appropriate dimensions. In other arrangements, brazing pin 150 can be created by altering an existing commercially available brazing pin, such as a standard M8 threaded brazing pin. FIG. 7A illustrates in side elevation view an example commercial brazing pin used to form a pin brazed mounting arrangement. Brazing pin 700 can be a commercially available M8 threaded brazing pin. As such, brazing pin 700 can include brazing capsule 753 below main body 757, which is in turn below threaded portion 756, among other regions and features as will be readily appreciated. In some arrangements, commercially available brazing pin 700 can be modified to form customized brazing pin 150 above, such as by machining away excess material at certain locations.

Figure 7B:
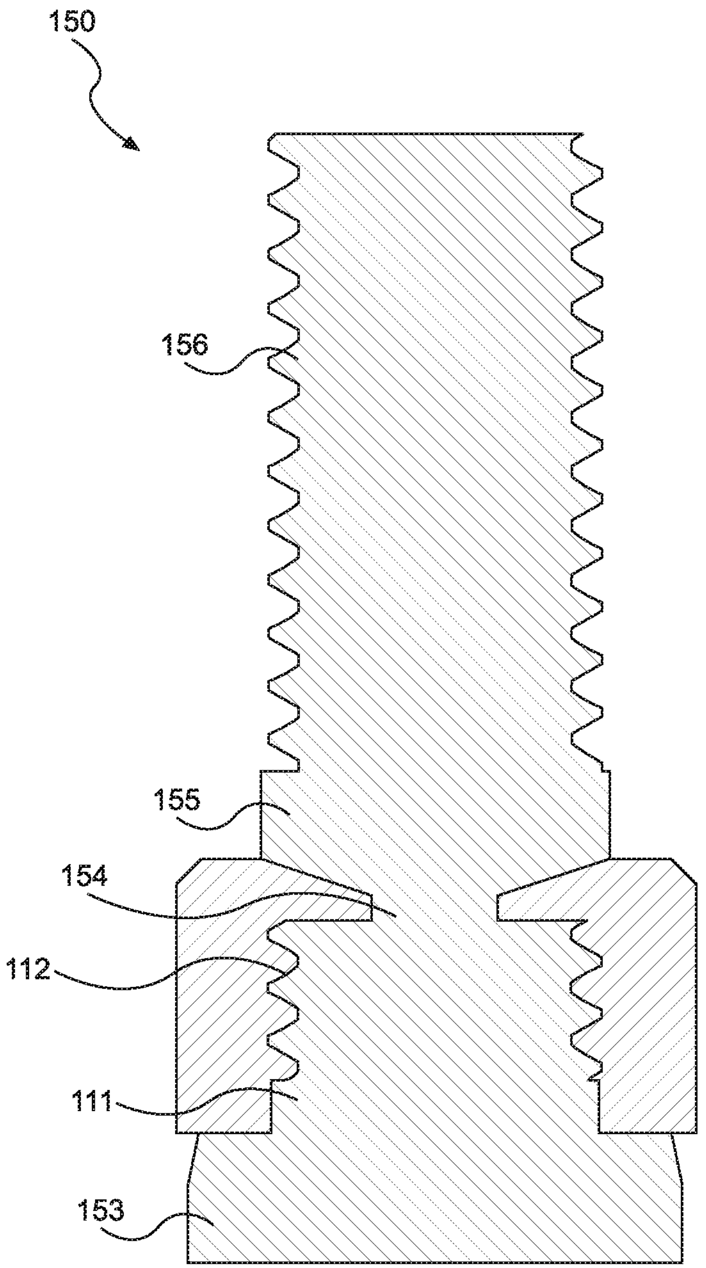
FIG. 7B illustrates in side cross-section view the commercial brazing pin of FIG. 7A modified to form the customized brazing pin of FIG. 6 according to one embodiment of the present disclosure.

FIG. 7B illustrates in side cross-section view the commercial brazing pin of FIG. 7A modified to form the customized brazing pin of FIG. 6. As shown, certain regions of the commercially available brazing pin above can be removed to result in a brazing pin 150 having brazing capsule 153, initial offset region 111, threaded region 112, neck 154, upper unthreaded region 155 and upper threaded region 156. Brazing capsule 153, upper unthreaded region 155, and upper threaded region 156 can remain intact as contained in those portions of commercially available brazing pin 700 above, while the main body 757 of this original pin can be machined or otherwise modified to result in the formation of initial offset region 111, threaded region 112, and neck 154. Other customized brazing pin formation techniques are also possible.

Figure 8:
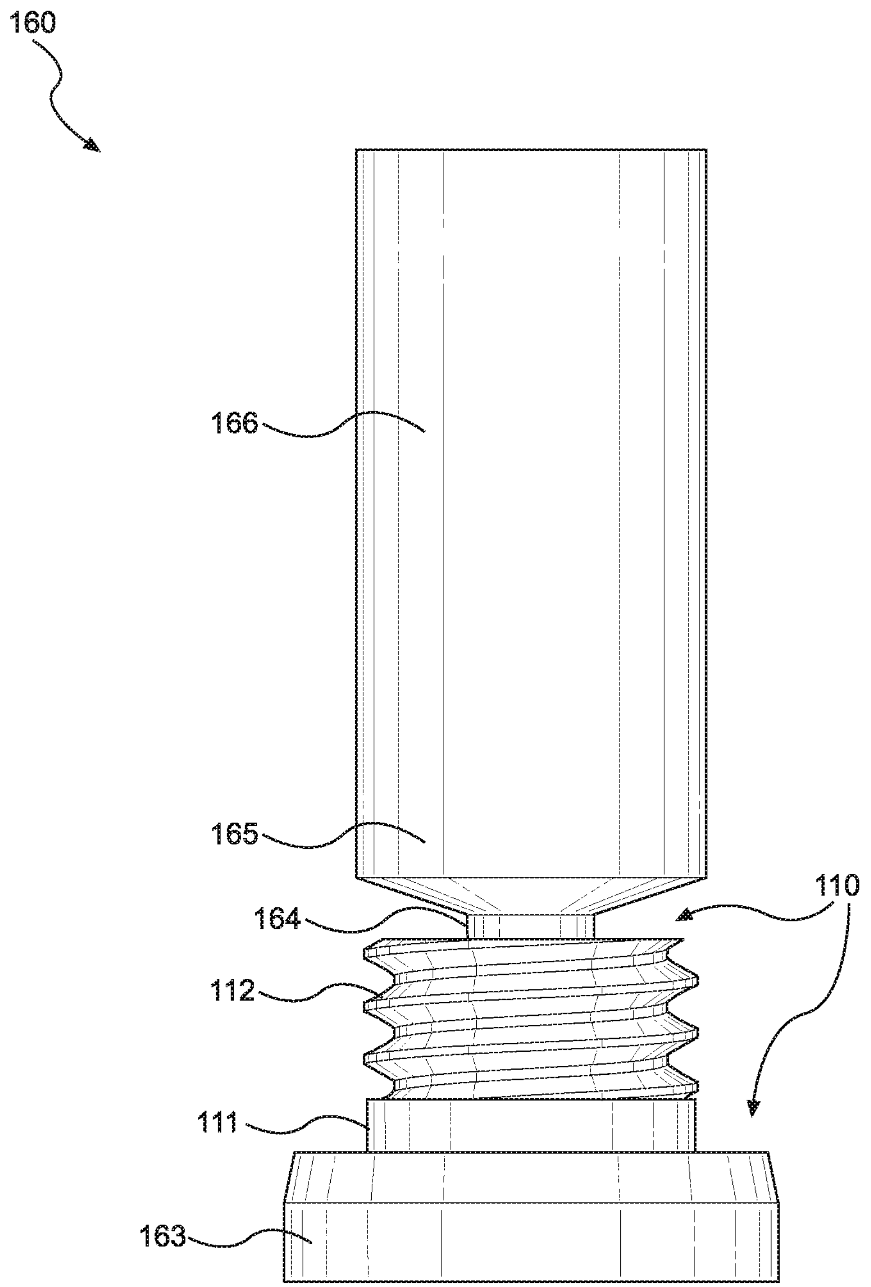
FIG. 8 illustrates in side elevation view an example alternative customized brazing pin used to form a pin brazed mounting arrangement according to one embodiment of the present disclosure.

Next, FIG. 8 illustrates in side elevation view an example alternative customized brazing pin used to form a pin brazed mounting arrangement. Alternative brazing pin 160 can be substantially similar to brazing pin 150 above, with all portions and features being identical except for the upper portion of the pin. For example, brazing capsule 163, initial offset region 111, threaded region 112, and neck 164 can be identical to those components on the above brazing pin 150 such that they can form what will ultimately be brazed stud 110 after brazing and removal of the upper portion or shank. Rather than have an upper threaded region in its upper portion or shank, alternative brazing pin 160 can have an upper unthreaded region 165 directly above neck 164 and a fully unthreaded region 166 extending to the top of the pin. In some arrangements, upper untreaded region 165 and fully unthreaded region 166 can be integrally formed to result in a fully unthreaded shank that is removable by way of lateral force breaking off the shank at neck 164.

As in the case of brazing pin 150 above, alternative brazing pin 160 can be formed as an original unit or can be formed by modifying an existing commercially available brazing pin in a similar manner. As will be readily appreciated, the exact geometries and dimensions of the upper portions of brazing pins 150 and 160 are not important for the functionality of the remaining brazed stud 110 since these upper portions are to be removed during installation of the brazing pins. Rather, these geometries and dimensions can conform to that which is needed in order to use a standard brazing gun to braze a pin to an outer surface of a mechanical asset, as it will be appreciated that it is generally not possible to use a brazing gun to braze only a short brazed stud portion to the mechanical asset surface. Accordingly, any suitable shank portion is possible for a customized brazing pin having a lower portion that will result in brazed stud 110.

Figure 9:
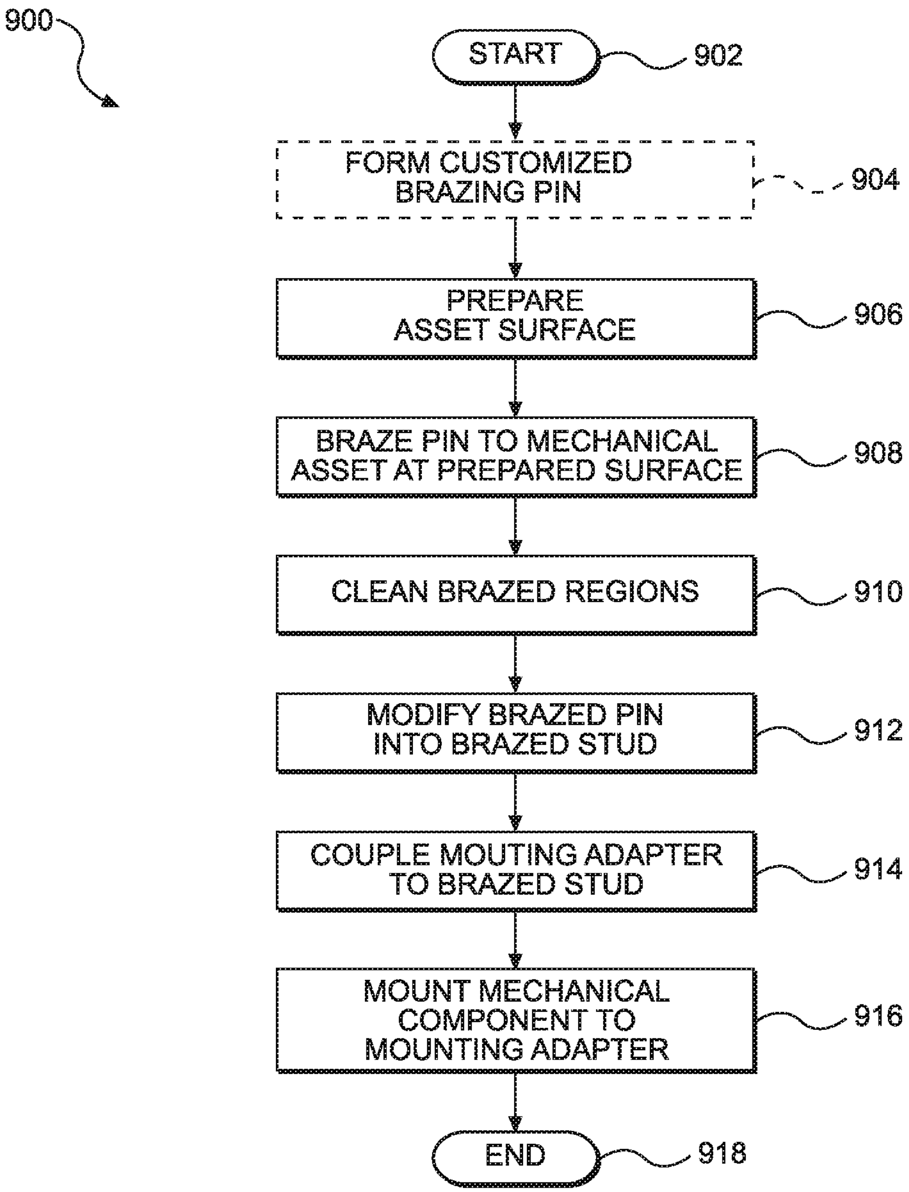
FIG. 9 illustrates a flowchart of an example detailed method of mounting a mechanical component to a mechanical asset using a pin brazed mounting arrangement according to one embodiment of the present disclosure.

Lastly, FIG. 9 illustrates a flowchart of an example detailed method of mounting a mechanical component to a mechanical asset using a pin brazed mounting arrangement. Detailed method 900 can represent one possible way of mounting a mechanical component to a mechanical asset using a pin brazed mounting arrangement, and it will be understood that various other steps, features, and details of such a detailed method are not provided here for purposes of simplicity. Detailed method 900 can include some or all steps and details of summary method 200 above, as will be readily appreciated. While detailed method 900 contemplates mounting a vibration sensor to an industrial motor as a specific illustrative example, it will be readily appreciated that other mechanical components and/or other mechanical assets can alternatively be used.

After a start step 902, an initial optional process step 904 can involve forming a customized brazing pin. Step 904 can be performed in situations where a suitable brazing pin is not already available for a pin brazed mounting arrangement. As detailed above, the customized brazing pin can include a neck, a lower portion with a brazing capsule and threaded region located below the neck, and an upper portion located above the neck, among other features. Forming the customized brazing pin can involve modifying an existing commercially available brazing pin as noted above or can involve creating the customized brazing pin as an original unique unit.

At the next process step 906, a target surface of the mechanical asset can be prepared. This can involve removing any paint or foreign substance from the outer surface, cleaning the outer surface, creating a substantially flat region, or any other preparation step as may be needed for a given target surface, as will be readily appreciated.

At a subsequent process step 908, the customized brazing pin can be brazed to the mechanical asset at the prepared surface. Step 908 can be identical or substantially similar to step 204 above in some arrangements, and as such can involve a conventional brazing process using a brazing gun and other brazing equipment to braze the customized pin to a suitable surface on the mechanical asset.

Process step 910 can involve cleaning the brazed regions after brazing is finished. This can involve removing excess brazing material from the outer surface of the mechanical asset and/or from a lower region of the brazing pin. A wire brush or other suitable tool or instrument can be used for cleaning the brazed regions as will be readily appreciated.

At process step 912, the customized brazing pin can be modified to form a brazed stud. Step 912 can be identical or substantially similar to step 206 above in some arrangements, and as such can involve breaking off or otherwise removing a top portion of the brazing pin at a neck to leave only the brazed stud behind. Any suitable technique can be used to remove the top portion or shank of the brazing pin.

At the next process step 914, a mounting adapter can be coupled to the brazed stud. Step 914 can be identical or substantially similar to step 208 above in some arrangements, and as such can involve engaging a first internally threaded region proximate a bottom surface of the mounting adapter onto the threaded region of the brazed stud. Again, the mounting adapter can be rotated onto the brazed stud after the threaded regions are engaged, for example.

At a subsequent process step 916, the mechanical component can be mounted to the mounting adapter. Step 916 can be identical or substantially similar to step 212 above in some arrangements, and as such can involve rotatably inserting a threaded portion of the mechanical component into the threaded inner opening of the mounting adapter.

Detailed method 900 can then end at end step 918. Again, the mechanical component and mechanical asset can be separate items from each other and also separate from the pin brazed mounting arrangement, which can be used to mount one of these separate items to the other. In some arrangements, one or more of the foregoing steps can be performed simultaneously or in a different order. For example, steps 914-916 can be performed simultaneously. Alternatively, step 916 can be performed before steps 914. Not all steps are necessary in all situations, and other steps and details may be added. Method 900 can also include ordinary details or substeps in the surface preparing, brazed region cleaning, and pin brazing processes as will be readily appreciated. Other process steps can include adjusting rotational orientations and applying torques during the installations of the mounting adapter and/or mechanical component, among other possible steps. Further process steps and details for detailed method 900 can be added and may be extrapolated from that which is disclosed herein as well as that which is disclosed in the other references that are incorporated by reference herein.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A pin brazed mounting arrangement, comprising:

a brazing pin having a neck, a lower portion with a brazing capsule located below the neck, and an upper portion located above the neck, wherein the neck is configured to facilitate removal of the upper portion after actuating the brazing capsule to braze the brazing pin to an outer surface of a separate mechanical asset to leave behind a brazed stud having a threaded region that is brazed to the outer surface of the separate mechanical asset; and a mounting adapter having a top surface, a bottom surface, a plurality of side surfaces, a first internally threaded region proximate its bottom surface configured to engage rotationally with the threaded region of the brazed stud to couple the mounting adapter to the brazed stud, and a second internally threaded region proximate its top surface configured to accept a rotational insertion therein of a threaded portion of a separate mechanical component such that the separate mechanical component is mounted to the separate mechanical asset.

2. The pin brazed mounting arrangement of claim 1, wherein the separate mechanical asset is an industrial motor and the separate mechanical component is a vibration sensor.

3. The pin brazed mounting arrangement of claim 1, wherein the lower portion of the brazing pin includes the brazing capsule, an initial offset region above the brazing capsule that is not threaded, and a threaded region above the initial offset region.

4. The pin brazed mounting arrangement of claim 1, wherein the upper portion of the brazing pin forms a removable shank that includes an upper unthreaded region and an upper threaded region.

5. The pin brazed mounting arrangement of claim 1, wherein the upper portion of the brazing pin forms a removable shank that is completely unthreaded.

6. The pin brazed mounting arrangement of claim 1, wherein the brazing pin is formed by modifying an existing commercially available brazing pin.

7. The pin brazed mounting arrangement of claim 6, wherein the existing commercially available brazing pin is an M8 threaded brazing pin.

8. The pin brazed mounting arrangement of claim 1, wherein the neck has a height of about 0.6 mm and a diameter of about 3.5 mm.

9. The pin brazed mounting arrangement of claim 1, wherein the first internally threaded region and the second internally threaded region are formed along a single internal opening that extends through the entire mounting adapter from the top surface to the bottom surface.

10. The pin brazed mounting arrangement of claim 1, wherein the plurality of side surfaces on the mounting adapter include a plurality of flat regions.

11. The pin brazed mounting arrangement of claim 1, wherein the mounting adapter further includes an enlarged internal opening between its bottom surface and the first internally threaded region, the enlarged internal opening having a greater diameter than the diameter of the first internally threaded region and configured to accept therein an unthreaded region of the brazed stud that is below the threaded region of the brazed stud.

12. A mounting system, comprising:

a sensor having a sensor protrusion with a threaded portion configured to facilitate mounting the sensor to a separate mechanical asset that is larger than the sensor; and a pin brazed mounting arrangement configured to be coupled to the sensor, the pin brazed mounting arrangement including:

a brazing pin having a neck, a lower portion with a brazing capsule located below the neck, and an upper portion located above the neck, wherein the neck is configured to facilitate removal of the upper portion after actuating the brazing capsule to braze the brazing pin to an outer surface of the separate mechanical asset to leave behind a brazed stud having a threaded region that is brazed to the outer surface of the separate mechanical asset, and a mounting adapter having a top surface, a bottom surface, a plurality of side surfaces, a first internally threaded region proximate its bottom surface configured to engage rotationally with the threaded region of the brazed stud to couple the mounting adapter to the brazed stud, and a second internally threaded region proximate its top surface configured to accept a rotational insertion therein of the threaded portion of the sensor such that the sensor is mounted to the separate mechanical asset.

13. The mounting system of claim 12, wherein the sensor is a vibration sensor.

14. The mounting system of claim 12, wherein the lower portion of the brazing pin includes the brazing capsule, an initial offset region above the brazing capsule that is not threaded, and a threaded region above the initial offset region.

15. The mounting system of claim 12, wherein the neck has a height of about 0.6 mm and a diameter of about 3.5 mm.

16. The mounting system of claim 12, wherein the first internally threaded region and the second internally threaded region are formed along a single internal opening that extends through the entire mounting adapter from the top surface to the bottom surface.

17. The mounting system of claim 12, wherein the plurality of side surfaces on the mounting adapter include a plurality of flat regions.

18. The mounting system of claim 12, wherein the mounting adapter further includes an enlarged internal opening between its bottom surface and the first internally threaded region, the enlarged internal opening having a greater diameter than the diameter of the first internally threaded region and configured to accept therein an unthreaded region of the brazed stud that is below the threaded region of the brazed stud.

19. A method of mounting a mechanical component to a mechanical asset using a pin brazed mounting arrangement, the method comprising:

brazing a brazing pin to an outer surface of a mechanical asset using a brazing gun, wherein the brazing pin includes a neck, a lower portion with a brazing capsule and threaded region located below the neck, and an upper portion located above the neck;

modifying the brazing pin to form a brazed stud having a threaded region that is brazed to the outer surface of the separate mechanical asset, wherein the modifying includes removing the upper portion of the brazing pin;

coupling a mounting adapter to the brazed stud by engaging a first internally threaded region proximate a bottom surface of the mounting adapter onto the threaded region of the brazed stud; and mounting a mechanical component to the mounting adapter by rotationally inserting a threaded portion of the mechanical component into a second internally threaded region proximate a top surface of the mounting adapter.

20. The method of claim 19, wherein the mechanical component is a sensor and the mechanical asset is an industrial motor, and further comprising:

forming the brazing pin;

preparing the outer surface of the industrial motor for brazing;

cleaning the brazed regions of the industrial motor and brazing pin after brazing;

adjusting the rotational orientation of the mounting adapter; and adjusting the rotational orientation of the sensor.

* * * * *